(12) United States Patent
Farnsworth (10) Patent No.: US 10,871,519 B2
(45) Date of Patent: Dec. 22, 2020

(54) FUEL CELL STACK PREDICTION UTILIZING IHOS

(71) Applicant: Toyota Motor Engineering & Manufacturing North America, Inc., Erlanger, KY (US)

(72) Inventor: Jared Farnsworth, Gardena, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 514 days.

(21) Appl. No.: 15/806,239

(22) Filed: Nov. 7, 2017

(65) Prior Publication Data
US 2019/0137571 A1 May 9, 2019

(51) Int. Cl.
*G01R 31/367* (2019.01)
*G05B 17/02* (2006.01)
(Continued)

(52) U.S. Cl.
CPC ........... *G01R 31/367* (2019.01); *G05B 17/02* (2013.01); *H01M 8/045* (2013.01);
(Continued)

(58) Field of Classification Search
None
See application file for complete search history.

(56) References Cited

U.S. PATENT DOCUMENTS 6,442,455 B1 8/2002 Kotre et al.
6,480,767 B2 11/2002 Yamaguchi et al.
(Continued)

FOREIGN PATENT DOCUMENTS

CN 202065044 12/2011
CN 202930480 8/2013
(Continued)

OTHER PUBLICATIONS

Markus Özbek et. al., Modeling and control of a PEM fuel cell system: A practical study based on experimental defined component behavior, Journal of Process Control 23 (2013) 282-293 (Year: 2013).*
(Continued)

*Primary Examiner* — Justin C Mikowski
(74) *Attorney, Agent, or Firm* — Snell & Wilmer LLP (57) ABSTRACT

Methods, systems, and device for real-time two-dimensional modeling of a fuel cell stack of a vehicle. The method includes obtaining a dataset having multiple data points. A data point of the multiple data points is associated with one set of conditions and a homotopic operating state. The method includes generating a first matrix that has multiple sets of conditions from the plurality of data points. The method includes generating a second matrix of multiple operating states from the multiple data points. Each operating state is associated with at least one of the multiple sets of conditions. The method includes generating an interpolation of homotopic operation states (IHOS) model based on the first matrix and the second matrix. The IHOS model has multiple reference rows of the sets of conditions associated with a homotopic operating state. The method includes rendering, on a display, the IHOS model.

18 Claims, 6 Drawing Sheets

(51) Int. Cl.
*H01M 8/04701* (2016.01)
*H01M 8/0438* (2016.01)
*H01M 8/04746* (2016.01)
*H01M 8/04492* (2016.01)
*H01M 8/04992* (2016.01)
*G06F 30/00* (2020.01)

(52) U.S. Cl.
CPC ... *H01M 8/04388* (2013.01); *H01M 8/04395* (2013.01); *H01M 8/04492* (2013.01); *H01M 8/04507* (2013.01); *H01M 8/04708* (2013.01); *H01M 8/04753* (2013.01); *H01M 8/04992* (2013.01); *G06F 30/00* (2020.01); *H01M 2250/20* (2013.01)

(56) References Cited

U.S. PATENT DOCUMENTS

| | | |
|---|---|---|
| 6,635,374 B1 | 10/2003 | Aramaki |
| 6,847,188 B2 | 1/2005 | Keskula et al. |
| 6,924,050 B2 | 8/2005 | Lahiff |
| 6,936,359 B2 | 8/2005 | Kobayashi et al. |
| 7,117,078 B1 | 10/2006 | Gangopadhyay |
| 7,124,040 B2 | 10/2006 | Engelhardt et al. |
| 7,141,326 B2 | 11/2006 | Kobayashi et al. |
| 7,247,401 B2 | 7/2007 | Aberle et al. |
| 7,348,082 B2 | 3/2008 | Kolodziej |
| 7,353,900 B2 | 4/2008 | Abe et al. |
| 7,608,011 B2 | 10/2009 | Grabowski et al. |
| 7,612,532 B2 | 11/2009 | Verbrugge |
| 7,682,717 B2 | 3/2010 | Ueda et al. |
| 7,682,719 B2 | 3/2010 | Lienkamp et al. |
| 7,687,164 B2 | 3/2010 | Frost et al. |
| 7,845,187 B2 | 12/2010 | Patel et al. |
| 7,919,211 B2 | 4/2011 | Nonobe et al. |
| 8,044,534 B2 | 10/2011 | Kojima et al. |
| 8,141,356 B2 | 3/2012 | Leone et al. |
| 8,153,321 B2 | 4/2012 | Katano |
| 8,215,428 B2 | 7/2012 | Lee et al. |
| 8,293,413 B2 | 10/2012 | Bono |
| 8,342,275 B2 | 1/2013 | Ojima et al. |
| 8,394,542 B2 | 3/2013 | Elwart et al. |
| 8,486,574 B2 | 7/2013 | Jenings |
| 8,498,766 B2 | 7/2013 | Takahashi et al. |
| 8,561,453 B2 | 10/2013 | Hobmeyr et al. |
| 8,568,935 B2 | 10/2013 | Arthur et al. |
| 8,673,515 B2 | 3/2014 | Harris et al. |
| 8,684,117 B2 | 4/2014 | Ptacek et al. |
| 8,691,456 B2 | 4/2014 | Choe et al. |
| 8,715,875 B2 | 5/2014 | Chan et al. |
| 8,722,263 B2 | 5/2014 | Cai et al. |
| 8,754,392 B2 | 6/2014 | Caimi et al. |
| 8,757,223 B2 | 6/2014 | Uemura |
| 8,796,984 B2 | 8/2014 | Yoshida et al. |
| 8,846,262 B2 | 9/2014 | Mussro et al. |
| 8,920,995 B2 | 12/2014 | Lebzelter et al. |
| 8,935,029 B2 | 1/2015 | Sabrie et al. |
| 8,951,685 B2 | 2/2015 | Aso et al. |
| 8,956,778 B2 | 2/2015 | Zhang et al. |
| 8,962,208 B2 | 2/2015 | Mussro et al. |
| 8,986,899 B2 | 3/2015 | Harris et al. |
| 8,997,771 B2 | 4/2015 | Lee et al. |
| 9,002,568 B2 | 4/2015 | Datta et al. |
| 9,005,785 B2 | 4/2015 | Alp et al. |
| 9,021,824 B2 | 5/2015 | Koo et al. |
| 9,099,701 B2 | 8/2015 | Maslyn et al. |
| 9,187,009 B2 | 11/2015 | Jeon et al. |
| 9,242,532 B2 | 1/2016 | Kim et al. |
| 9,242,573 B2 | 1/2016 | Lee et al. |
| 9,281,532 B2 | 3/2016 | Lebzelter et al. |
| 9,281,533 B2 | 3/2016 | Ozawa et al. |
| 9,312,549 B2 | 4/2016 | Tachibana et al. |
| 9,318,778 B2 | 4/2016 | Wahlstrom et al. |
| 9,358,900 B2 | 6/2016 | Wake et al. |
| 9,437,884 B2 | 9/2016 | Kolodziej |
| 9,457,640 B2 | 10/2016 | Ikeya |
| 9,472,818 B2 | 10/2016 | Kilmer |
| 9,527,404 B2 | 12/2016 | Gauthier et al. |
| 9,531,019 B2 | 12/2016 | Jeon |
| 9,590,259 B2 | 3/2017 | Toida |
| 9,614,236 B2 | 4/2017 | Yu et al. |
| 9,620,796 B2 | 4/2017 | Tomita et al. |
| 9,620,799 B2 | 4/2017 | Igarashi et al. |
| 9,643,517 B2 | 5/2017 | Watanabe et al. |
| 2003/0105562 A1 | 6/2003 | Hsiao et al. |
| 2004/0018399 A1 | 1/2004 | Jung |
| 2006/0134472 A1 | 6/2006 | Bach et al. |
| 2008/0286622 A1 | 11/2008 | Shaw et al. |
| 2009/0050082 A1 | 2/2009 | Iwasaki |
| 2011/0214930 A1 | 9/2011 | Betts et al. |
| 2012/0129059 A1 | 5/2012 | Ohashi |
| 2013/0069792 A1* | 3/2013 | Blevins ............... G06F 17/16 340/815.4 |
| 2014/0000859 A1 | 1/2014 | Abihana |
| 2014/0000862 A1 | 1/2014 | Abihana et al. |
| 2014/0103128 A1 | 4/2014 | Patel et al. |
| 2014/0120440 A1 | 5/2014 | Nolan et al. |
| 2014/0335432 A1 | 11/2014 | Sinha et al. |
| 2014/0342253 A1 | 11/2014 | Lee et al. |
| 2014/0343695 A1* | 11/2014 | Di Cairano ......... G05B 13/048 700/31 |
| 2014/0370412 A1 | 12/2014 | Sumser et al. |
| 2015/0188157 A1 | 7/2015 | Na et al. |
| 2016/0006049 A1 | 1/2016 | Kwon et al. |
| 2016/0137096 A1 | 5/2016 | Oda et al. |
| 2016/0141645 A1 | 5/2016 | Yamada et al. |
| 2016/0141661 A1 | 5/2016 | Kim et al. |
| 2016/0141666 A1 | 5/2016 | Shim et al. |
| 2016/0153367 A1 | 6/2016 | Yoon |
| 2016/0172696 A1 | 6/2016 | Milacic et al. |
| 2016/0211536 A1 | 7/2016 | Kwon et al. |
| 2016/0336607 A1 | 11/2016 | Lee et al. |
| 2016/0359181 A1 | 12/2016 | Lee |
| 2016/0372768 A1 | 12/2016 | Proctor et al. |
| 2017/0012310 A1 | 1/2017 | Han |
| 2017/0047603 A1 | 2/2017 | Kazuno |
| 2017/0092972 A1 | 3/2017 | Pence |
| 2017/0162885 A1 | 6/2017 | Kim |
| 2017/0179511 A1 | 6/2017 | Jung et al. |
| 2019/0064790 A1* | 2/2019 | Yamamoto ....... G06Q 10/06395 |

FOREIGN PATENT DOCUMENTS

| | | |
|---|---|---|
| CN | 105895941 | 8/2016 |
| DE | 102012224052 | 6/2014 |
| GB | 2533015 | 6/2016 |
| JP | 2005347008 | 12/2005 |
| KR | 100863649 | 6/2007 |
| WO | WO2005078257 | 8/2005 |
| WO | WO2013073457 | 5/2013 |

OTHER PUBLICATIONS

Pablo Guinta et al.; "Calculation of Multiplicity of Steady States in a Catalyst Pellet By Homotopic Continuation Method"; AIChE Journal; (40 pages).

* cited by examiner

FUEL CELL STACK PREDICTION UTILIZING IHOS

BACKGROUND

1. Field

This specification relates to a system and a method for modeling the behavior of a fuel cell stack device.

2. Description of the Related Art

Vehicles, such as electric vehicles (EV) and fuel cell electric vehicles (FCEV), have a fuel cell stack that performs an electrochemical reaction to power the electric motor of the vehicle. The fuel cell stack generates electricity to power the motor. Typically, the fuel cell stack uses oxygen and compressed hydrogen to generate electricity. In general, one or more sensors may monitor an output state of the fuel cell stack to configure other operations of the vehicle to more efficiently generate electrical energy. For example, the vehicle may adjust one or more inputs to the fuel cell stack, such as an air flow rate or a gas flow rate, in response to the monitored output state to more efficiently generate the electrical energy. These sensor components have an additional cost and take up additional space within the vehicle. More importantly, these sensors may not monitor many variables that affect the electrochemical reaction that occurs in the fuel cell stack.

Accordingly, there is a need for a system and a method to model complex systems, such as the fuel cell stack, that have multiple interrelated conditions that result in one or more operating states to more efficiently control the operation of components within the vehicle without the need for additional hardware.

SUMMARY

In general, one aspect of the subject matter described in this specification is embodied in a method for real-time two-dimensional modeling of a fuel cell stack of a vehicle. The method includes obtaining a dataset having multiple data points. A data point of the multiple data points is associated with one set of conditions and a homotopic operating state. The method includes generating a first matrix that has multiple sets of conditions from the plurality of data points. The method includes generating a second matrix of multiple operating states from the multiple data points. Each operating state is associated with at least one of the multiple sets of conditions. The method includes generating an interpolation of homotopic operation states (IHOS) model based on the first matrix and the second matrix. The IHOS model has multiple reference rows of the sets of conditions associated with a homotopic operating state. The method also includes rendering, on a display, the IHOS model.

These and other embodiments may optionally include one or more of the following features. The method may include a first reference row of the multiple reference rows of the IHOS model that is a linear interpolation of a second reference row. The first reference row may have homotopic operating states that are a linear deformation of the homotopic operating states of the second reference row.

The method may include bounding the multiple data points based on the multiple sets of conditions to generate the first matrix. The method may include selecting multiple data points that are associated with a first condition within a first range and a second condition within a second range such that the selected data points are an equidistant apart in each reference row when bounding the multiple data points. The one or more data points in a reference row of the multiple reference rows of the IHOS model may be an equidistant apart.

A condition of one of the sets of conditions may include an anode operating condition including a pressure or a flow rate of a gas species or water vapor, a cathode operating condition including a pressure or a flow rate of a gas or water vapor, an overall amount of water in the fuel cell stack, a flux or an amount of water transfer between an anode and a cathode. The homotopic operating state may include a generated voltage for a cell of the fuel cell stack or a water balance of the fuel cell stack.

The method may include obtaining a set of conditions and interpolating an operating state based on the set of conditions using the IHOS model. The method may also include controlling an operation of the vehicle based on the operating state. The set of conditions may not be included in the multiple sets of conditions.

The method may include determining a target row for the set of conditions. The target row may be between a first reference row and a second reference row of the IHOS model. The method may include calculating a first difference between the target row and the first reference row. The method may include calculating a second difference between the target row and the second reference row. The method may include interpolating the operating state based on the first difference and the second difference. The method may also include controlling an air flow rate, a temperature or a pressure of the air into or in the fuel cell stack.

In another aspect, the subject matter is embodied in a system for a vehicle. The system includes a fuel cell stack for providing electrical energy to the vehicle. The system includes an electronic control unit that is connected to the fuel cell stack. The electronic control unit is configured obtain data of multiple sets of conditions and multiple operating states. The electronic control unit is configured to generate a first matrix of multiple sets of conditions from the dataset. The electronic control unit is configured to generate a second matrix of multiple homotopic operating states from the dataset. The electronic control unit is configured to generate an interpolation of homotopic operating states model based on the first matrix and the second matrix. The electronic control unit is configured to obtain a set of conditions to predict or determine a homotopic operating state. The electronic control unit determines or predicts the homotopic operating state based on the set of conditions and controls operation of the vehicle based on the determined or predicted homotopic operating state.

In another aspect, the subject matter is embodied in a method for real-time two-dimensional modeling of a fuel cell stack. The method includes obtaining a dataset. The dataset has multiple data points. A data point is associated with a plurality of sets of conditions and a homotopic operating state. A set of conditions of the multiple sets of conditions is associated with the homotopic operating state. The method includes generating a first matrix that has the multiple sets of conditions from the plurality of data points. The method includes generating a second matrix of multiple operating states. The method includes generating an interpolation of homotopic operating states model based on the first matrix and the second matrix. The IHOS model has multiple reference rows of the multiple sets of conditions that are associated with at least one homotopic operating state. The method includes controlling operation of the fuel cell stack using the IHOS model.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for minimizing a size of a lookup table when predicting outcomes of different states of a fuel cell device by interpolating homotopic operating states. Particular embodiments of the subject matter described in this specification may be implemented to realize one or more of the following advantages.

A fuel cell stack prediction and control system uses an integrated homotopic operating states (IHOS) model and is integrated, utilized, embedded and/or included within a vehicle. The fuel cell stack prediction and control system models the fuel cell stack and/or other devices or systems that require processing of complex data sets. The fuel cell stack prediction and control system uses a multi-dimensional model, such as a two-dimensional model or a three-dimensional model, that models the behavior of the fuel cell stack in real-time and in multiple dimensions for faster and more accurate results than a traditional one-dimensional model. Moreover, the prediction and control system uses the IHOS model within an electronic control unit of a vehicle to perform analysis and simulation for vehicle components, unlike other models, such as computational fluid dynamics model, that require devices with significantly more processing power than an electronic control unit. In particular, the IHOS model may predict or interpolate an output or an outcome. By interpolating and/or predicting the output or the outcome, the IHOS model does not need to maintain a computationally-intensive lookup table that includes a complete set of data points that associate the input conditions with the output operating states. Instead, the IHOS model minimizes the dataset required and interpolates the output states or the outcome states from the input conditions. Thus, a processor using the IHOS model requires less storage, less processing power and less time to search, retrieve and interpolate the dataset. More importantly, an IHOS model predicts the output or the outcome more accurately because the IHOS model interpolates the predicted output or outcome rather than relying on a lookup table with a finite number of values.

Other benefits and advantages include the ability to model the behavior of the fuel cell stack with incomplete data without the need for additional sensors. Thus, the vehicle does not need to have additional hardware, such as sensors, to monitor the conditions and/or the outcomes. This results in a reduction in hardware and a corresponding reduction in cost, weight, maintenance and space.

Figure 1:
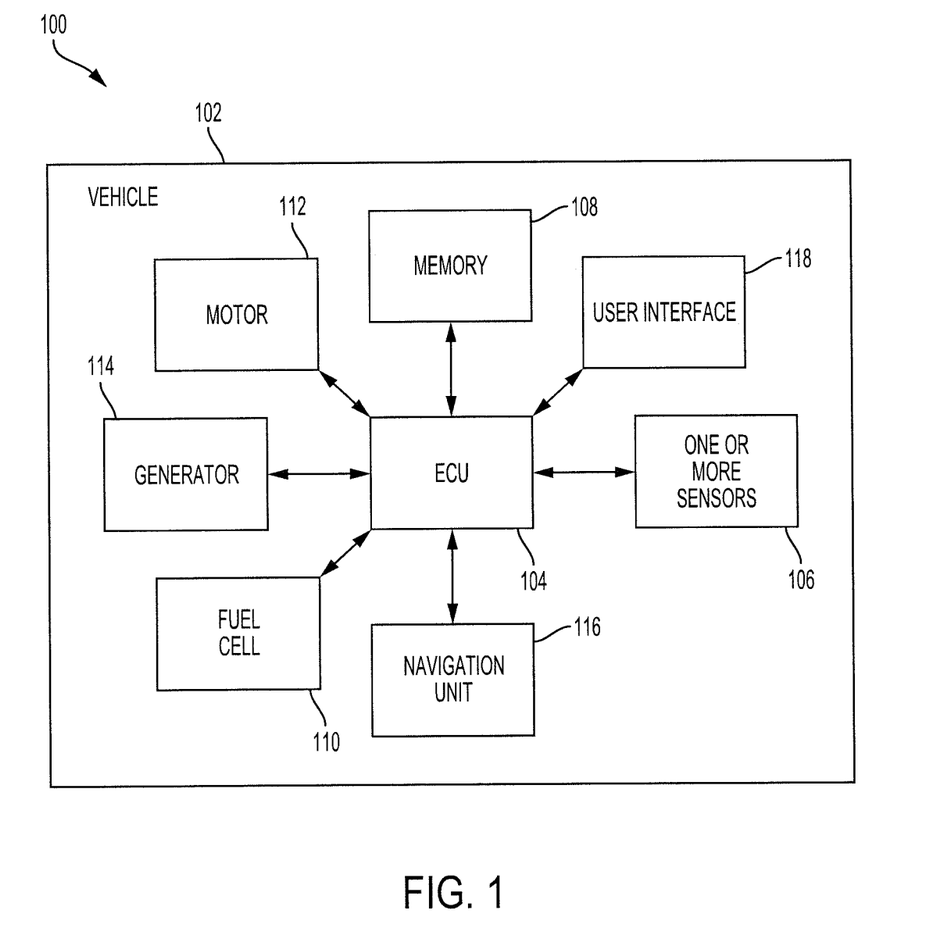
FIG. 1 is a block diagram of an example fuel cell stack prediction and control system according to an aspect of the invention.

FIG. 1 is a block diagram of a fuel cell stack prediction and control system 100 that uses an interpolation homotopic operating states (IHOS) model to model behaviors within the fuel cell stack. The fuel cell stack prediction and control system ("prediction and control system") 100 includes an electronic control unit 104 (ECU), one or more sensors 106, a memory 108 and a fuel cell 110. The prediction and control system 100 may include a user interface 118.

The prediction and control system 100 includes a processor, such as the ECU 104. The ECU 104 may be implemented as a single ECU or as multiple ECUs. The ECU 104 may be electrically coupled to some or all of the components of the vehicle 102. The ECU 104 may include one or more processors or controllers specifically designed for generating the IHOS model and/or determining or predicting an operating state or condition using the IHOS model in real-time. The ECU 104 may control an operation of the vehicle 102 based on the determined or predicted output state or input condition. By using the prediction and control system 100 to model the behavior of the operations of the vehicle 102, less sensors are needed to monitor or respond to the condition or operating state. This reduces the overall cost of the vehicle 102 and reduces the amount of space needed for hardware components. Moreover, by interpolating unknown homotopic operating states or conditions, the prediction and control system 100 requires less processing power and memory to predict the unknown homotopic operating states or conditions in real-time and may be integrated within a vehicle 102.

The prediction and control system 100 includes a memory 108 that may be coupled to the ECU 104. The memory 108 stores instructions that are executed by the ECU 104. The memory 108 may include one or more of a Random Access Memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 104.

Figure 2:
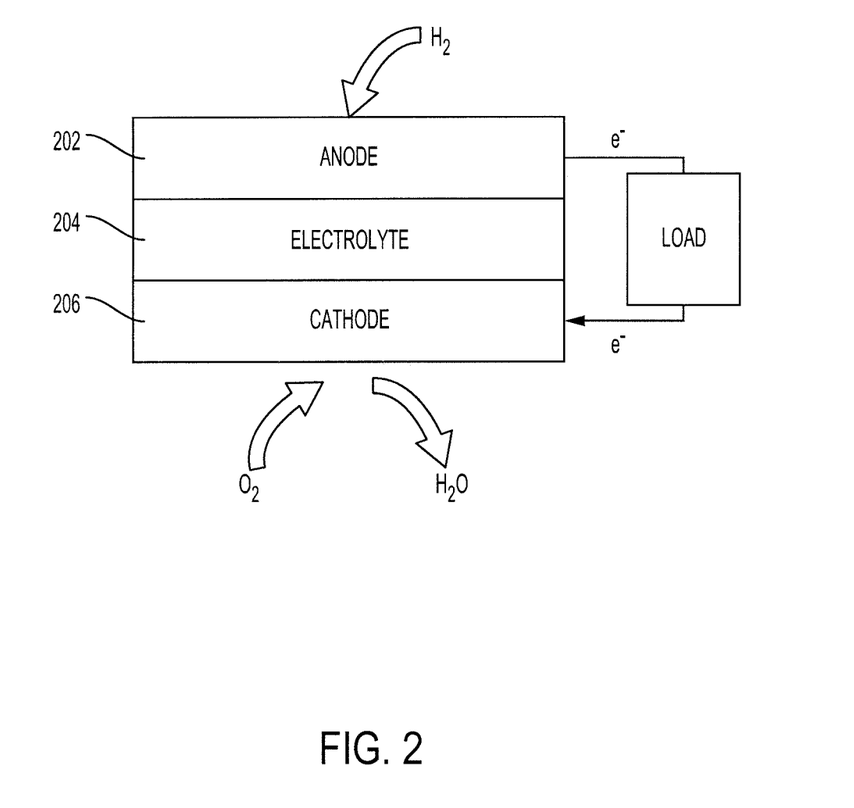
FIG. 2 shows the fuel cell stack of FIG. 1 according to an aspect of the invention.

The prediction and control system 100 includes a fuel cell 110. The fuel cell 110 may chemically fuse oxygen from the air and hydrogen from the fuel tank to make water and release electrical energy that powers the motor 112 of the vehicle 102. FIG. 2 further describes the fuel cell 110.

The prediction and control system 100 includes one or more sensors 106. The one or more sensors 106 may monitor, measure, detect and/or otherwise obtain data regarding various inputs or conditions to the fuel cell 110 and various outputs, outcomes or operating states of the fuel cell 110. The various conditions of the fuel cell 110 may include the gas pressure or the water pressure within the cathode/anode, the gas temperature or the water temperature within the cathode/anode, the mol flow rate of the gas or the water within the cathode/anode or the mol fraction of the gas or the water within the anode. Other conditions may include an overall amount of water in the fuel cell 110, and a flux or an amount of gas or water transfer between the anode and the cathode. The various gases may include hydrogen, nitrogen and/or oxygen. The various outputs of the fuel cell 110 include a voltage and/or a water balance cross-over.

The one or more sensors 106 may monitor, measure, detect and/or otherwise obtain data regarding operations of the vehicle 102, such as the vehicle speed, the air/water temperature within a component of the vehicle 102, such as a turbo compressor, an inter cooler or a fuel cell 110.

The prediction and control system 100 may include a user interface 118. The prediction and control system 100 may display one or more notifications on the user interface 118 that indicate initialization of or adjustment by the prediction and control system 100. The prediction and control system 100 may display the data collected by the one or more sensors 106, such as the pressure or flow rate of the gases or liquids within the fuel cell 110 and/or the operating temperature of the fuel cell 110. The prediction and control system 100 may display the IHOS model on the user interface 118.

The prediction and control system 100 may be included in, retro-fitted on, or connected to a vehicle 102, such as an electric vehicle (EV), a fuel cell vehicle (FCV), a fuel cell electric vehicle (FCEV) or any other vehicle that uses a fuel cell. The vehicle 102 may include a motor 112, a generator 114 and/or a navigation unit 116.

A vehicle 102 is a conveyance capable of transporting a person, an object, or a permanently or temporarily affixed apparatus. A vehicle 102 may be a self-propelled wheeled conveyance, such as a car, a sports utility vehicle, a truck, a bus, a van or other motor or battery driven or fuel cell driven vehicle. For example, the vehicle 102 may be an electric vehicle, a hybrid vehicle, a plug-in hybrid vehicle or any other type of vehicle that has a fuel cell 110, a motor 112 and/or a generator 114. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may have and use one or more sensors 106 and/or navigation unit 116 to drive autonomously.

The vehicle 102 may include a motor 112 and/or a generator 114. The motor 122 and/or the generator 114 may be an electric motor and an electric generator, respectively, that converts electrical energy into mechanical power, such as torque, and converts mechanical power into electrical energy.

The vehicle 102 may include a navigation unit 116 that obtains navigational map information and/or vehicle information to autonomously navigate the vehicle 102 and/or display the rate to the user through the user interface 118. The navigational map information may include a map that identifies roadways, terrains and other points of interest to navigate the vehicle 102. The navigational map information may include route information that includes a starting point, a destination and a path of travel from the starting point to the destination for the vehicle 102. The vehicle information may include a current location of the vehicle 102, a current direction of travel of the vehicle 102 and/or a current speed of the vehicle 102.

FIG. 2 shows the fuel cell 110 of the vehicle 102 that is part of the prediction and control system 100. The fuel cell 110 uses an electrochemical reaction of hydrogen fuel with oxygen or another oxidizing agent to generate electrical energy. The fuel cell is formed from an anode 202, an electrolyte 204 and a cathode 206. At the anode 202, a catalyst oxidizes the fuel, which is generally hydrogen, to convert the fuel to a positively charged ion and a negatively charged ion. The ions travel from the anode 202 to the cathode 206 through the electrolyte 204. The electrolyte 204 prevents electrons from passing through. The electrons instead pass through a wire creating the electric current. The ions reunite with the electrons in the cathode 206 where a cathode 206 catalyst reacts the electrons with another gas, such as oxygen, to form water.

The prediction and control system 100 may monitor, control and/or predict the various interactions and behaviors of the anode 202 and the cathode 206. The various interactions and behaviors that may be predicted, monitored and/or subsequently controlled include conditions, such as the flux or flow rate of gases or water vapor between the anode 202 and the cathode 206, and operating states, such as the voltage produced by the fuel cell 110 or the water balance cross-over of the fuel cell 110.

Figure 3:
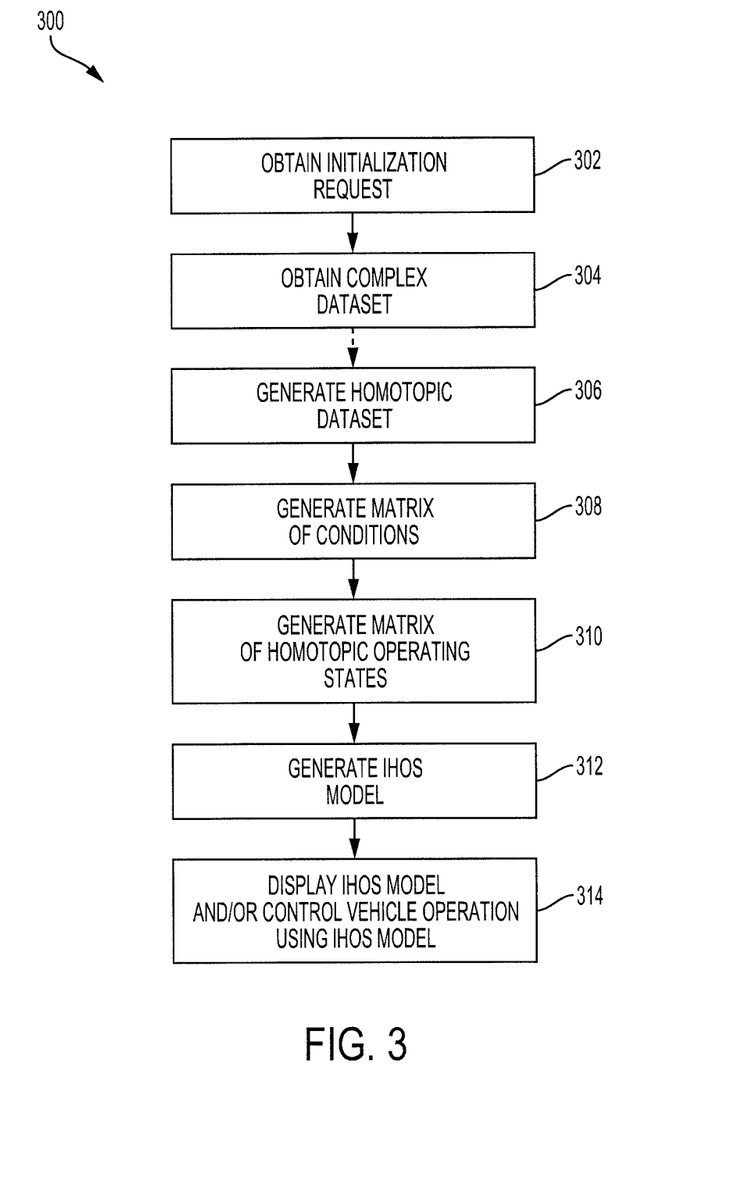
FIG. 3 is a flow diagram of an example process for generating the interpolated homotopic operating state model used by the fuel cell stack prediction and control system of FIG. 1 according to an aspect of the invention.

FIG. 3 is a flow diagram of the process 300 for generating the interpolation of homotopic operating states (IHOS) model used by the fuel cell stack prediction and control system 100 of FIG. 1. One or more computers or one or more data processing apparatuses, for example, the one or more processors, such as the ECU 104 of the prediction and control system 100 of FIG. 1, appropriately programmed, may implement the process 300 to generate the IHOS model.

The prediction and control system 100 obtains an initialization request that initiates the prediction and control system 100 (302). The prediction and control system 100 may receive the initialization request when a user activates the prediction and control system 100, e.g., when a user activates the prediction and control system 100 from the user interface 118 or when the vehicle is powered on. The prediction and control system 100 may receive the initialization request from the one or more sensors 106. For example, when an EV and/or FCEV vehicle 102 is turned on, a fuel cell sensor may detect that the fuel cell 110 is in operation and send the initialization request to the prediction and control system 100 in response to detecting that the fuel cell 110 is turned on.

The prediction and control system 100 obtains a complex dataset that includes multiple data points that represent multiple conditions and multiple operating states (304). The prediction and control system 100 performs analysis and models the behavior of complex systems, such as the fuel cell 110, that have multiple inputs or conditions that cause multiple outputs or operating states. The behavior of complex systems may require multi-dimensional modelling due to the multiple conditions and multiple operating states which results in large complex datasets for the lookup tables that are generally used to model behavior within the complex systems.

The complex dataset may be generated from benchmark or test data. The prediction and control system 100 may obtain the complex dataset from another model, such as a computational fluid dynamics (CFD) model. The prediction and control system 100 may import the complex data or have the complex data preprogrammed and stored in the memory 108 where the prediction and control system 100 may access the complex data set.

The prediction and control system 100 may generate a homotopic dataset that includes one or more data points of the multiple data points from the complex dataset (306). A data point within the homotopic dataset includes a set of conditions and the associated homotopic operating state. A set of conditions of the multiple conditions is associated with one or more operating states, such that when the set of conditions are present or occur, the one or more operating states result. That is, the existence of the set of conditions in the fuel cell stack causes or results in the one or more operating states. Moreover, the sets of conditions and/or operating states occur at the same time. The prediction and control system 100 may collect the one or more operating states that have a homotopic relationship along with the set of conditions that are associated with the one or more operating states. Two operating states have a homotopic relationship if one state may be continuously deformed into the other. That is, one operating state can be continuously deformed to an adjacent operating state. These two operating states may have a linear deformation where the prediction and control system 100 may linearly interpolate between one state in one reference row of the IHOS model that is mapped and the other state in a different reference row of the IHOS model that is mapped.

The prediction and control system 100 generates a first matrix of conditions from the data points within the homotopic dataset (308). The first matrix includes multiple sets of conditions that are each associated with one or more homotopic operating states. The prediction and control system 100 may bound the data points within the homotopic dataset. The prediction and control system 100 may limit the analysis and generation of the IHOS model to data points within a range for each condition. The data points may be bounded based on multiple conditions and multiple thresholds for the different conditions. For example, the prediction and control system 100 may bound data points within a first range for a first condition and a second range for a second condition. The first range for the first condition may be a range of current in the fuel cell 110 and the second range for the second condition may be a range of gas/water temperature in the fuel cell 110, for example. Once the data points are bounded, the prediction and control system 100 may map the bounded data points and select the data points that are equidistant apart along a reference row or curve of the bounded data points when the data points are mapped. The prediction and control system 100 may store the sets of conditions within the first matrix.

The prediction and control system 100 generates a second matrix of homotopic operating states from the data points within the homotopic dataset (310). The prediction and control system 100 collects the equivalent homotopic operating states of the stored sets of conditions within the first matrix. The equivalent homotopic operating states may be the corresponding homotopic operating states that are associated with the sets of conditions of the bounded and selected data points. That is, the operating states that result when the conditions occur.

The prediction and control system 100 generates an interpolation of homotopic operating states (IHOS) model based on the first matrix and the second matrix (312). The IHOS model may arrange multiple reference rows of data points on a coordinate system. The multiple reference rows of data points represent the homotopic operating states at different sets of conditions. The data points are arranged on the coordinate system according to the sets of conditions of the data point. The prediction and control system may use the IHOS model to interpolate data and control vehicle operation using the IHOS model, such as an existing condition or an expected operating state, and/or render, on a display, the IHOS model so that a user may visually interpolate the data (314).

Figure 4:
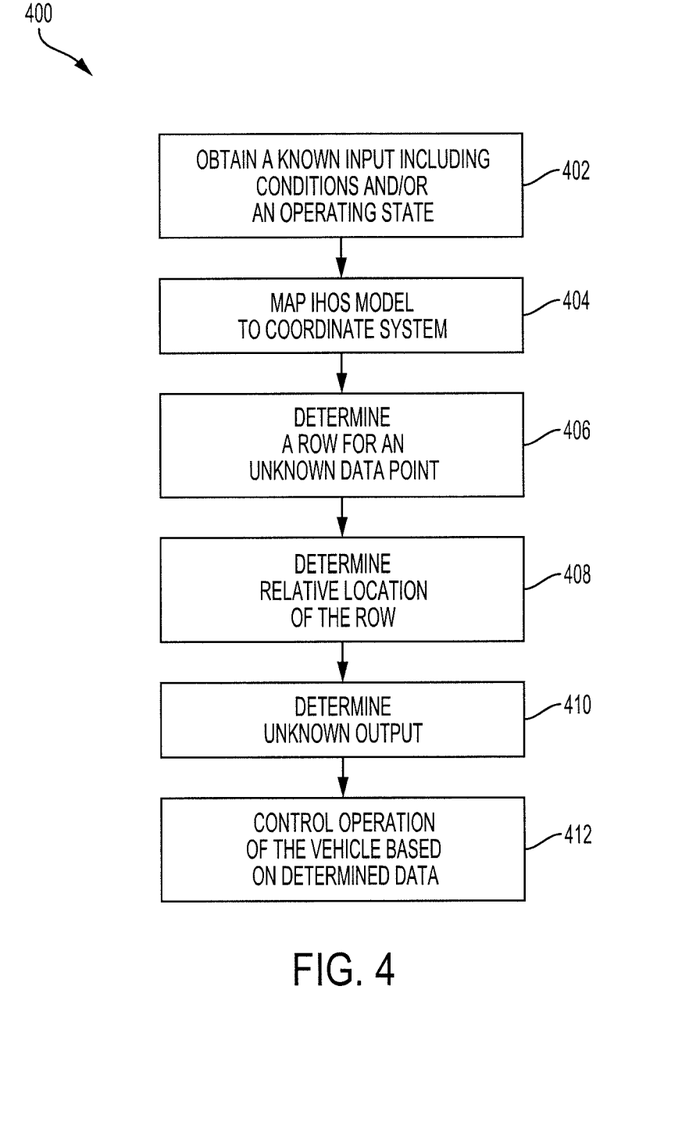
FIG. 4 is a flow diagram of an example process for predicting an operational state and controlling an operation of the vehicle using the fuel cell stack prediction and control system of FIG. 1 according to an aspect of the invention.

FIG. 4 is a flow diagram of the process 400 for predicting a condition and/or an operating state of the fuel cell 110, using the IHOS model and control a vehicle operation. One or more computers or one or more data processing apparatuses, for example, the one or more processors, such as the ECU 104 of the prediction and control system 100 of FIG. 1, appropriately programmed, may implement the process 400 to predict the condition and/or the operating state.

The prediction and control system 100 may obtain a known input. The known input may be a known set of conditions or a combination of one or more known conditions and one or more known operating states, such that there is only a single unknown output that is to be determined or predicted (402). A known input is an input, such as a condition or an operating state that is measured or detected by the prediction and control system 100 or obtained from another device, such as through user input. The unknown output may be a homotopic operating state if all the conditions of the set of conditions are known or may be a condition of the set of conditions if the other conditions and operating state(s) are known. The prediction and control system 100 may represent the known input and the unknown output as an unknown data point until the unknown output is predicted or determined.

The prediction and control system 100 interpolates the unknown output based on the known conditions and/or the known operating state using the IHOS model. Thus, the IHOS model does not require that all data points of the model, i.e., all the sets of conditions and all the operating states, to be stored or obtained which reduces memory storage and processing requirements.

Figure 5:
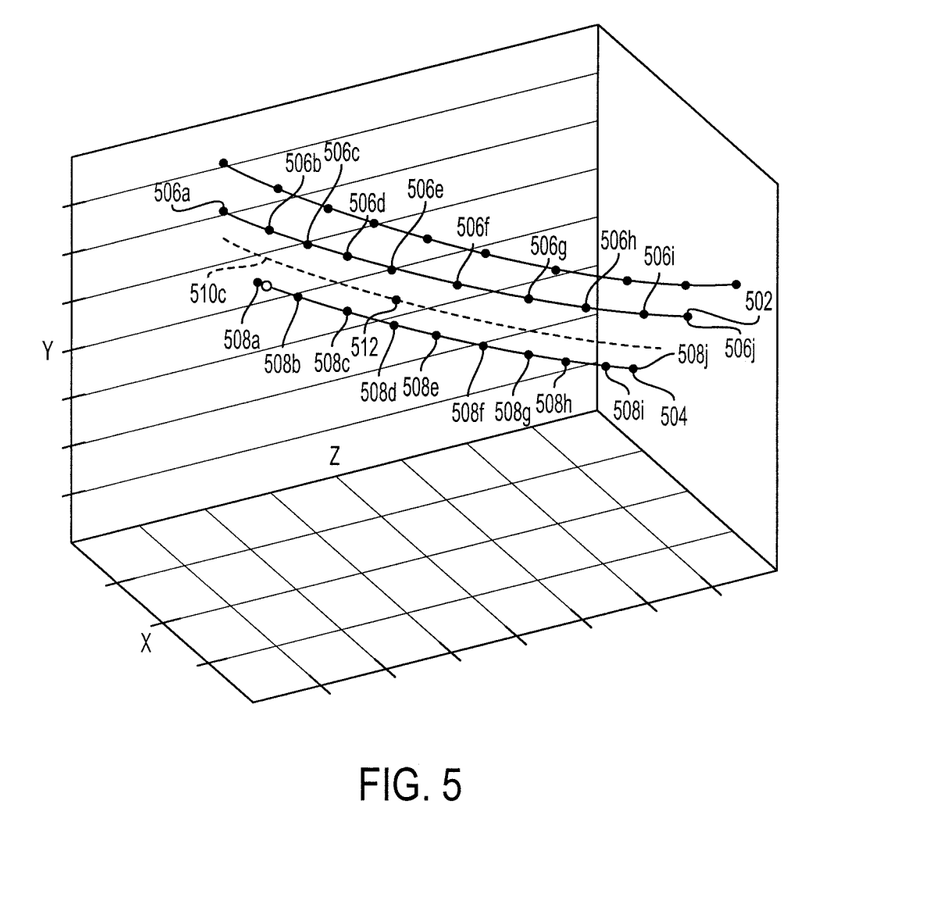
FIG. 5 is a graph of an example IHOS model generating by the fuel cell stack prediction and control system of FIG. 1 according to an aspect of the invention.

The prediction and control system 100 maps the first matrix and the second matrix onto a coordinate system (404). The prediction and control system 100 maps each reference row of data points of the IHOS model. For example, the prediction and control system 100 maps a first reference row 502 and a second reference row 504 of known data points 506a-j, 508a-j, respectively. Each of the known data points includes a set of conditions ($X_n$, $Y_n$) and an associated homotopic operating state, $Z_n$, that are known by the IHOS model.

The prediction and control system 100 determines a target row for the unknown data point within the coordinate system where the unknown data point lies (406). The prediction and control system 100 may determine the target row based on the known input. The unknown data point is a data point that represents the obtained known input and an unknown output. For example, the prediction and control system 100 determines the target row 510 has the unknown data point 512.

The prediction and control system 100 determines a relative location of the target row to adjacent reference rows (408). The target row may be a linear deformation and/or interpolation of the adjacent reference rows. The prediction and control system 100 determines which two reference rows of known data points the target row for the unknown data point is in between and calculates a difference between the target row for the unknown data point and each of the two reference rows 502, 504 of known data points to determine the relative location. For example, the prediction and control system 100 determines that target row 510 is in between reference rows 502, 504 and calculates the difference between target row 510 and reference rows 502, 504.

Since the prediction and control system 100 has a relative location of the target row with the unknown data point, the prediction and control system 100 determines the unknown output based on the relative location of the target row for the unknown data point and the known input of the unknown data point (410). The prediction and control system 100 may calculate multiple data points along the target row by linearly interpolating the equivalent data points in the two reference rows that the target row lies between. Then, the prediction and control system 100 compares the known input to the interpolated data points along the target row and matches the known input to one of the interpolated data points to identify the unknown output.

That is, the prediction and control system 100 maps the known input onto the target row on the coordinate system to predict or determine the unknown output. If the conditions are known for the unknown data point, the prediction and control system 100 may predict or determine the operating, state, and if a condition is unknown and the operating states are known, the prediction and control system 100 may predict or determine the unknown condition. Thus, the IHOS model does not need to contain all the data points, as the prediction and control system 100 may interpolate any unknown data points. This reduces the amount of data that the prediction and control system 100 stores and/or processes to determine or predict the unknown data points.

The prediction and control system 100 controls operation of the vehicle 102, such as the fuel cell 110, using the determined previous unknown output (412). The prediction and control system 100 may adjust an air flow rate, a water flow rate, an air/water temperature and/or an air/water pressure within the fuel cell 110, for example.

Figure 6:
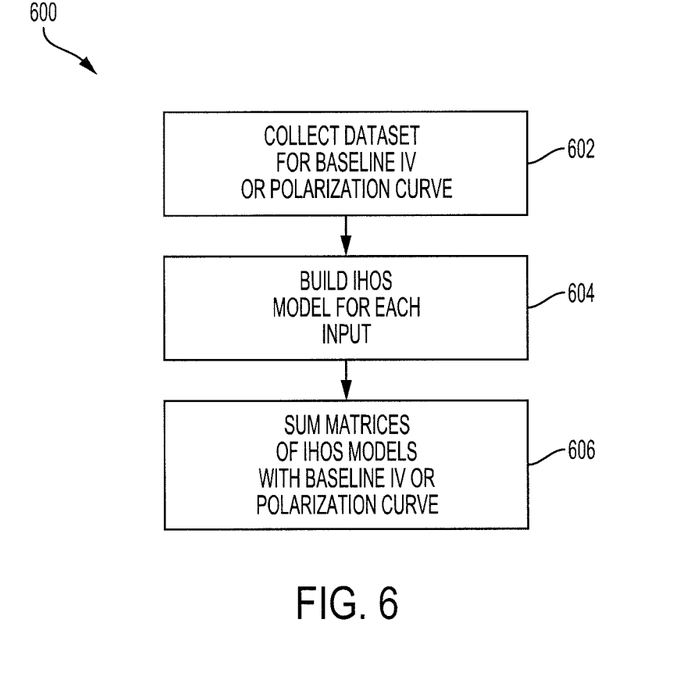
FIG. 6 is a flow diagram of an example process for determining the total effect of multiple conditions on an operating state using the IHOS model according to an aspect of the invention.

FIG. 6 is a flow diagram of the process 600 for predicting a total effect on an operating state by various conditions using the interpolated homotopic operating state (IHOS) model. One or more computers or one or more data processing apparatuses, for example, the one or more processors, such as the ECU 104 of the prediction and control system 100 of FIG. 1, appropriately programmed, may implement the process 600 to predict the operating state.

The prediction and control system 100 may determine or predict a total effect of various known inputs, such known conditions, on an unknown output, such as a homotopic operating state that is associated with the known conditions. The prediction and control system 100 collects a dataset that represents a baseline IV or polarization curve of the effect of baseline conditions on the homotopic operating state (602). The prediction and control system 100 may vary each known input independently while holding the other known inputs constant. The prediction and control system 100 may build an IHOS model composed of a matrix for each known input and the corresponding unknown output and/or variances of the unknown output that is determined using the IHOS model, as described in FIG. 4 (604). The prediction and control system 100 sums the matrices of the IHOS models that describe the output for each of the known inputs with the baseline IV or polarization curve to determine or predict the total effect the various known inputs have on the output (606).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for real-time two-dimensional modeling of a fuel cell stack, comprising:

obtaining a complex dataset having a plurality of data points, a data point of the plurality of data points being associated with a set of conditions of the fuel cell stack and an operating state of the fuel cell stack that results from the set of conditions;

generating a homotopic dataset based on the complex dataset;

generating a first matrix that includes a plurality of sets of conditions of the fuel cell stack based on the homotopic dataset;

generating a second matrix that includes a plurality of homotopic operating states based on the homotopic dataset, each homotopic operating state associated with at least one set of conditions of the plurality of sets of conditions;

generating an interpolation of homotopic operating states (IHOS) model that interpolates a behavior of operations of the fuel cell stack based on the first matrix and the second matrix, the IHOS model having a plurality of reference rows of the sets of conditions associated with the homotopic operating states including a first reference row and a second reference row, the first reference row being a linear interpolation of the second reference row and having a first homotopic operating state that is a linear deformation of a second homotopic operating state of the second reference row; and rendering, on a display, the HOS model.

2. The method of claim 1, wherein generating the first matrix includes bounding data points within the homotopic dataset including selecting the data points within the homotopic dataset that are associated with a first condition within a first range and a second condition within a second range, wherein the selected data points are an equidistant apart in each reference row.

3. The method of claim 1, wherein a condition of the set of conditions includes an anode operating condition including a pressure or flow rate of a gas or water vapor, a cathode operating condition including a pressure or flow rate of the gas or water vapor, an overall amount of water in the fuel cell stack, or a flux or amount of water transfer between an anode and a cathode.

4. The method of claim 1, wherein the homotopic operating states include a generated voltage for a cell of the fuel cell stack or a water balance of the fuel cell stack.

5. The method of claim 1, wherein two or more data points in the first reference row are equidistant apart.

6. The method of claim 1, further comprising:
obtaining a known set of conditions of the fuel cell stack;
interpolating an unknown operating state based on the known set of conditions using the HOS model; and
controlling an operation of a vehicle based on the interpolated operating state.

7. The method of claim 6, wherein the known set of conditions are not included in the plurality of sets of conditions.

8. The method of claim 6, wherein interpolating the unknown operating state based on the known set of conditions using the HOS model further includes:
determining a target row for the known set of conditions, the target row being between the first reference row of the HOS model and the second reference row of the HOS model;
calculating a first difference between the target row and the first reference row;
calculating a second difference between the target row and the second reference row; and interpolating the unknown operating state further based on the first difference and the second difference.

9. The method of claim 8, wherein controlling the operation of the vehicle based on the interpolated operating state includes controlling an air flow rate, a temperature or a pressure of air into the fuel cell stack.

10. A system for a vehicle, comprising:
a fuel cell stack for providing electrical energy to the vehicle; and
an electronic control unit connected to the fuel cell stack and configured to:
obtain a first dataset having a plurality of data points associated with a plurality of sets of conditions and a plurality of operating states,
generate a second dataset that includes data points that have a homotopic relationship from the first dataset,
generate a first matrix that includes a plurality of sets of conditions based on the second dataset,
generate a second matrix that includes a plurality of homotopic operating states based on the second dataset,
generate an interpolation of homotopic operating states (IHOS) model that interpolates a behavior of operations of the fuel cell stack based on the first matrix and the second matrix, the HOS model having a plurality of reference rows of the plurality of sets of conditions associated with the plurality of homotopic operating states including a first reference row and a second reference row, the first reference row being a linear interpolation of the second reference row and having a first homotopic operating state that is a linear deformation of a second homotopic operating state of the second reference row,
obtain a known set of conditions to predict or determine an unknown homotopic operating state,
determine or predict the unknown homotopic operating state based on the known set of conditions and the HOS model, and
control operation of the vehicle based on the determined or predicted homotopic operating state.

11. The system of claim 10, wherein the plurality of sets conditions when inputted into the fuel cell stack cause the plurality of homotopic operating states.

12. The system of claim 11, wherein one condition of a set of conditions of the plurality of sets of conditions includes an anode operating condition including a pressure or flow rate of a gas or water vapor, a cathode operating condition including a pressure or flow rate of the gas or water vapor, an overall amount of water in the fuel cell stack, a flux or amount of water transfer between an anode and a cathode for the gas or water vapor that transfers between the anode and the cathode.

13. The system of claim 11, wherein the plurality of homotopic operating states include a generated voltage for a cell of the fuel cell stack.

14. The system of claim 10, wherein the plurality of sets of conditions and the associated homotopic operating states are equidistant across a reference row.

15. The system of claim 10, wherein to generate the first matrix the electronic control unit is configured to:
bound the data points within the second dataset based on the plurality of sets of conditions; and
select the data points within the second data set, wherein the selected data points are an equidistant apart in each reference row when mapped on a coordinate system.

16. A method for real-time two-dimensional modeling of a fuel cell stack, comprising:
obtaining a complex dataset having a plurality of data points, a data point of the plurality of data points being associated with a set of conditions of the fuel cell stack and an operating state of the fuel cell stack that results from the set of conditions;
generating a homotopic dataset based on the complex dataset;
generating a first matrix that includes a plurality of sets of conditions based on the homotopic dataset;
generating a second matrix that includes a plurality of homotopic operating states based on the homotopic dataset;
generating an interpolation of homotopic operating states (IHOS) model that interpolates a behavior of operations of the fuel cell stack based on the first matrix and the second matrix, the IHOS model having a plurality of reference rows of the plurality of sets of conditions associated with at least one homotopic operating state, each reference row being a linear interpolation of the other reference rows of the plurality of reference rows and having a homotopic operating state that is a linear deformation of a homotopic operating state of one other reference row; and
controlling operation of the fuel cell stack using the IHOS model.

17. The method of claim 16, wherein each set of the plurality of sets of conditions and the associated homotopic operating state in the same reference row of the HOS model is equidistant apart from another set.

18. The method of claim 16, wherein a condition of one set of conditions of the plurality of sets of conditions includes an anode operating condition including a pressure or a flow rate of a gas or water vapor, a cathode operating condition including a pressure or a flow rate of the gas or water vapor, an overall amount of water in the fuel cell stack, or a flux or an amount of water transfer between an anode and a cathode for the gas or water vapor that transfers between the anode and the cathode.

* * * * *